(12) United States Patent
Chang

(10) Patent No.: US 9,606,306 B2
(45) Date of Patent: Mar. 28, 2017

(54) OPTICAL SIGNAL COUPLING ASSEMBLY

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 21 days.

(21) Appl. No.: 14/840,306

(22) Filed: Aug. 31, 2015

(65) Prior Publication Data

US 2016/0341918 A1 Nov. 24, 2016

(30) Foreign Application Priority Data

May 22, 2015 (CN) .......................... 2015 1 0264664

(51) Int. Cl.
| | |
|---|---|
| *H01J 40/14* | (2006.01) |
| *G02B 6/42* | (2006.01) |
| *G02B 6/32* | (2006.01) |
| *G02B 6/293* | (2006.01) |

(52) U.S. Cl.
CPC ......... *G02B 6/4215* (2013.01); *G02B 6/2938* (2013.01); *G02B 6/29362* (2013.01); *G02B 6/32* (2013.01); *G02B 6/4206* (2013.01); *G02B 6/4212* (2013.01); *G02B 6/4214* (2013.01); *G02B 6/4257* (2013.01); *G02B 6/4286* (2013.01)

(58) Field of Classification Search
CPC .......... H04B 10/00; H04B 10/07; G02B 6/26; G02B 6/32
USPC ....... 250/227.11, 216, 226; 398/118; 385/15, 385/33
See application file for complete search history.

(56) References Cited

U.S. PATENT DOCUMENTS

| | | | |
|---|---|---|---|
| 2006/0056851 A1* | 3/2006 | Takahashi | H04B 10/118 398/118 |
| 2011/0064357 A1* | 3/2011 | Chang | G02B 6/32 385/33 |

* cited by examiner

*Primary Examiner* — Kevin Pyo
(74) *Attorney, Agent, or Firm* — Zhigang Ma

(57) ABSTRACT

An optical communication assembly includes a PCB, a first optical coupling module, a light deflection module, and a second optical coupling module. The PCB includes a plurality of light emitting elements emitting different color light signals. The first optical coupling module includes a plurality of first lenses corresponding with light emitting element. The light deflection module includes a plurality of light deflection elements corresponding with optical coupling lenses. The light deflection element includes a first reflecting surface reflecting light signal, and a plurality of dichroic surfaces reflecting light signal from the first optical coupling lens and transmitting the light signal from a front light deflection element. The second optical coupling module includes a second lens and an optical fiber, color light signals emitted from the light emitting elements are reflected and transmitted by the light deflection module and then altogether coupled into the optical fiber.

16 Claims, 7 Drawing Sheets

US 9,606,306 B2

OPTICAL SIGNAL COUPLING ASSEMBLY

FIELD

The subject matter herein generally relates to fiber optic communications.

BACKGROUND

In the field of fiber optic communications, an optical signal coupling assembly often includes a first optical coupling module and a second optical coupling module coupling to the first optical coupling module to realize transmission of light signal. Transmission quality of the optical signals is determined by the alignment between the first connector and the second connector.

BRIEF DESCRIPTION OF THE DRAWINGS

Implementations of the present technology will now be described, by way of example only, with reference to the attached figures.

DETAILED DESCRIPTION

Figure 1:
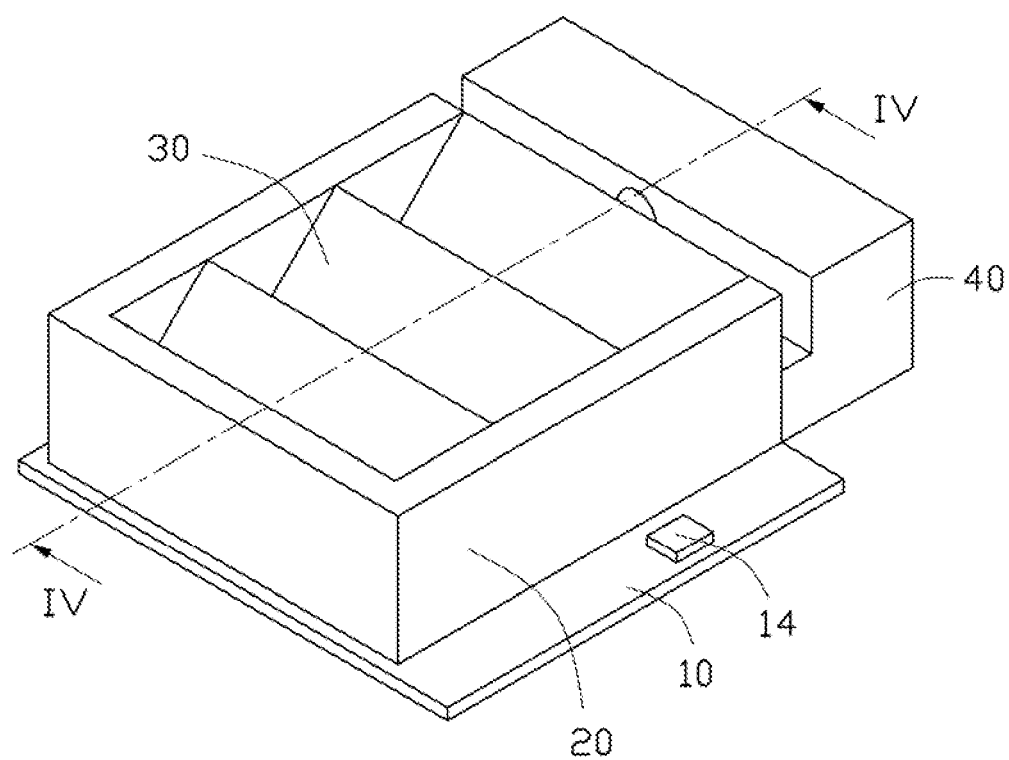
FIG. 1 is an isometric view of an optical communication assembly in accordance with a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

Figure 2:
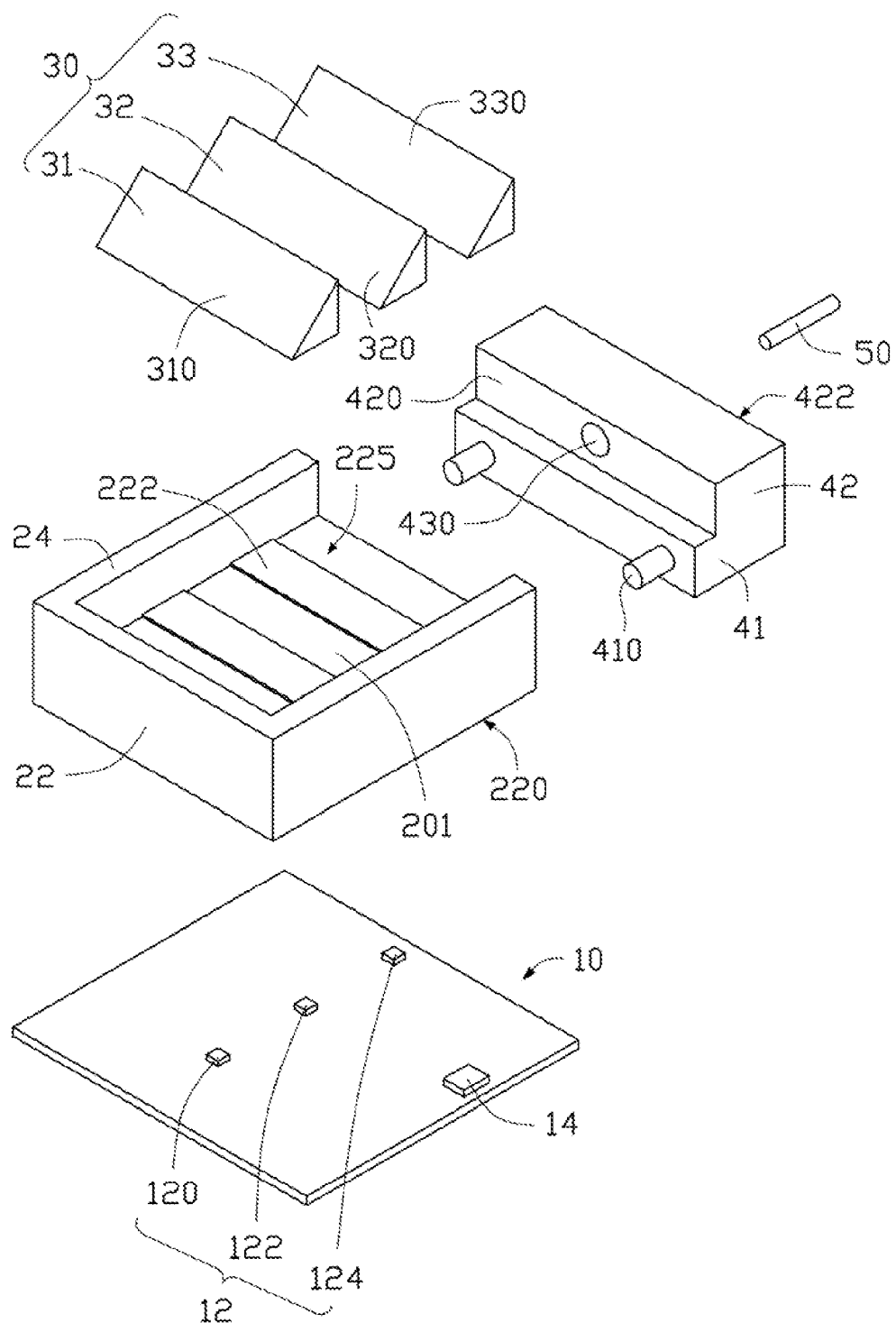
FIG. 2 is an exploded isometric view of the optical communication assembly of FIG. 1.

FIG. 1 and FIG. 2 illustrate an optical communication assembly 100 according to a first embodiment. The optical communication assembly 100 includes a printed circuit board 10, a first optical coupling module 20, a light deflection module 30, a second optical coupling module 40, and an optical fiber 50.

A group of light emitting members 12 and a control chip 14 are arranged on a printed circuit board 10. The group of light emitting members 12 comprises laser diodes able to emit different colors of light as light signals. In the illustrated embodiment, the group of light emitting members 12 includes a first light emitting element 120, a second light emitting element 122, and a third light emitting element 124. The first, the second, and the third light emitting element 120, 122, 124 are in a line. The first light emitting element 120, the second light emitting element 122, and the third light emitting element 124 respectively emit a first color light signal, a second color light signal, and a third color light signal. In the illustrated embodiment, the first light emitting element 120 emits blue light, the second light emitting element 122 emits green light, and the third light emitting element 124 emits red light. In an alternative embodiment, the number of light emitting members 12 is not limited to three, it can be two or more than three, and the colors of the light emitted from the light emitting element are not limited to the above arrangement, which can be adjusted according to actual needs.

The control chip 14 is electrically connected to the light emitting members 12 and configured to control the light emitting members 12 to emit light.

The first optical coupling module 20 is fixed on the printed circuit board 10. The first optical coupling module includes a base 22 and a side wall 24 connected with the base 22. The base 22 and the side wall 24 may be injection moldings. The side wall 24 is mainly used to limit the position of the light deflection module 30 on the base 22. The side wall 24 may not be necessary in alternative embodiments.

The base 22 is made from transparent plastic and substantially cuboid. The base 22 includes a bottom surface 220, an opposite top surface 222, and an outer side surface 223 perpendicularly connecting with the bottom surface 220 and the top surface 222. The side wall 24 connects with the top surface 222 and extends away from the top surface 222. The outer side surface 223 is arranged with two first positioning portions 224 which engage with the second optical coupling module 40. In the illustrated embodiment, the first positioning portions 224 are positioning holes.

The side wall 24 and the top surface 222 together form a receiving space 225, the bottom of the receiving space 225 (equal to the top surface 222) defines a plurality of limiting areas 201, and the limiting areas 201 are configured to locate the light deflection module 30.

The bottom surface 220 defines a plurality of receiving cavities 226 equally spaced apart, each receiving cavity 226 includes a bottom end surface 227, and each bottom end surface 227 is arranged with a first optical coupling lens 228. Each first optical coupling lens 228 is aligned with one of the light emitting members 12.

The light deflection module 30 is placed on the limiting area 201, the quantity of the light deflection modules 30 is same as quantity of the light emitting members 12. In the illustrated embodiment, the light deflection module 30 includes a first light deflection element 31, a second light deflection element 32, and a third light deflection element 33. The first, the second, and the third light deflection elements 31, 32, 32 are substantially rectangular prism shape and have a same size with each other.

The first light deflection element 31 includes a first reflecting surface 310. The second light deflection element 32 includes a first dichroic surface 320. The third light deflection element 33 includes a second dichroic surface 330. The first reflecting surface 320 is formed by a coating of a high reflectivity material, such as gold, silver, copper, or aluminum, on the inclined surface of the first light deflection light element 31. The first dichroic surface 320 and the second dichroic surface 330 are formed by dichroic coatings on the respective inclined surfaces of the second light deflection light element 32 and the third deflection light element 33. A dichroic mirror can also be arranged on the inclined surface of the second light deflection element 32 and the inclined surface of the third light deflection element 33. The first dichroic surface 320 and the second dichroic surface 330 achieve a transmission and reflection of light signals.

Figure 3:
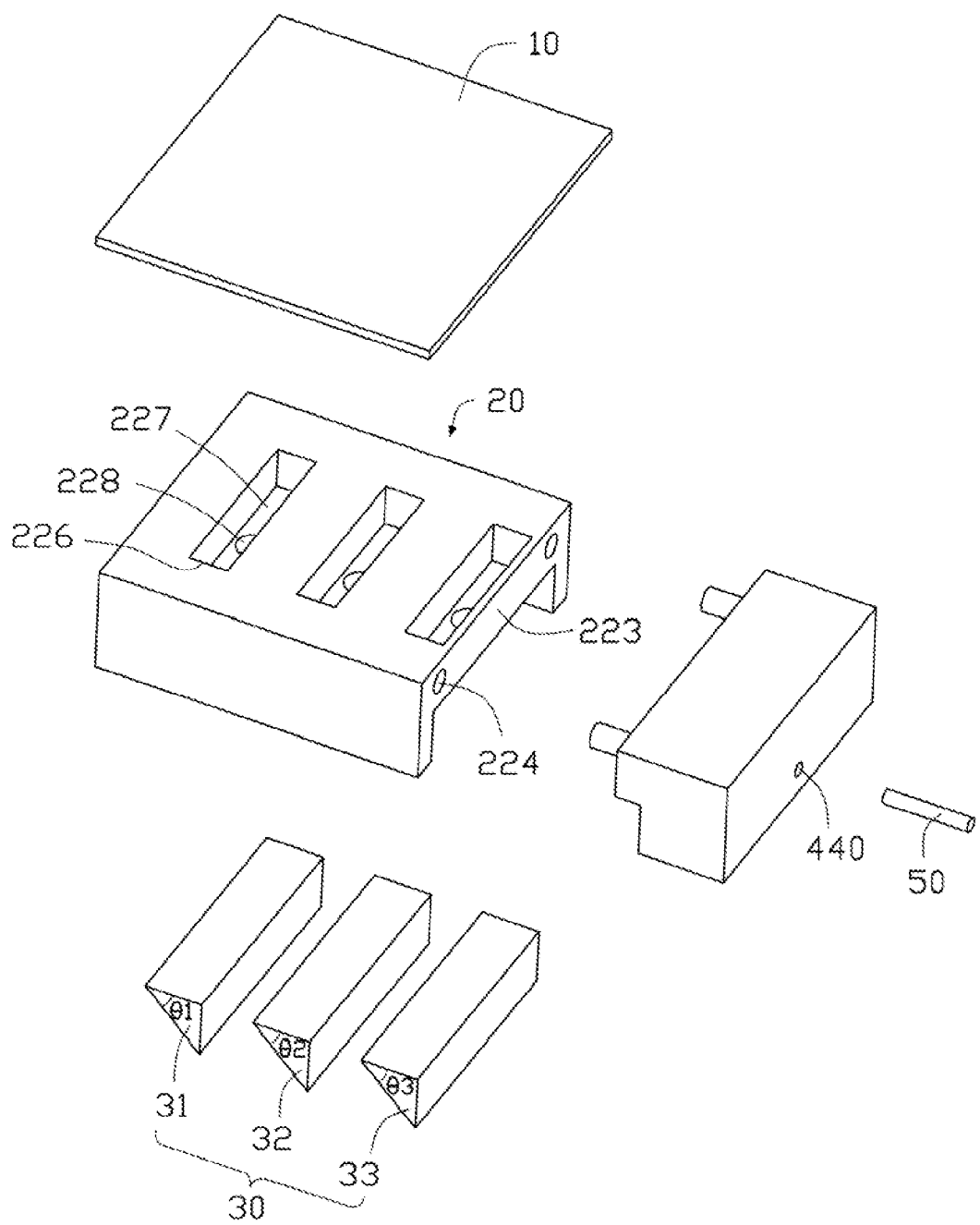
FIG. 3 is similar to FIG. 2, but viewed from another angle.
Figure 5:
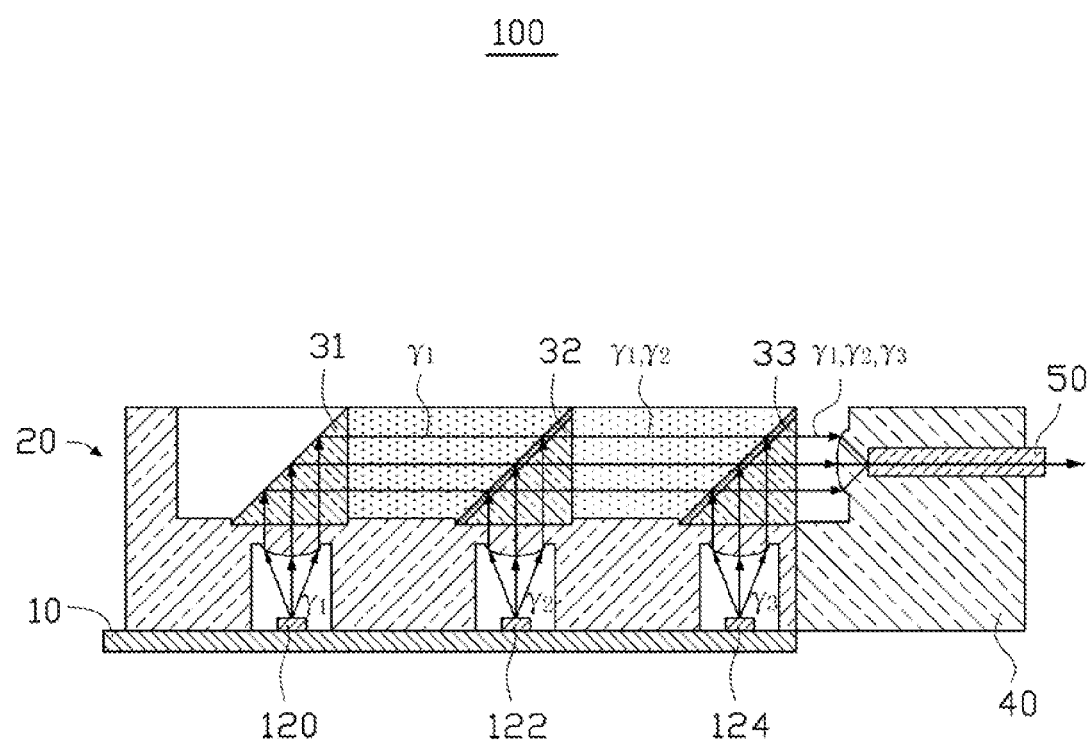
FIG. 5 is a cross-sectional view of the optical communication assembly in FIG. 4, including rays.

As shown in FIG. 3, an included angle between the first reflecting surface 310 and a rectangular surface of the first light deflection element 31 is θ1. An included angle between the first dichroic surface 320 and the rectangular surface of the second light deflection element 32 is θ2, and an included angle between the second dichroic surface 330 and the rectangular surface of the third light deflection element 33 is θ3. θ1=θ2=θ3=45°. As shown in FIG. 5, the first reflecting surface 310 reflects the first color light signal λ1 emitted from first optical coupling lens 228. The first dichroic surface 320 transmits the first color light signal λ1 and reflects the second color signal light λ2 emitted from the first optical coupling lens 228. The second dichroic surface 330 transmits the first and the second color light signals λ1 and λ2 and reflects the third color light signal λ3 emitted from the first optical coupling lens 228.

Figure 4:
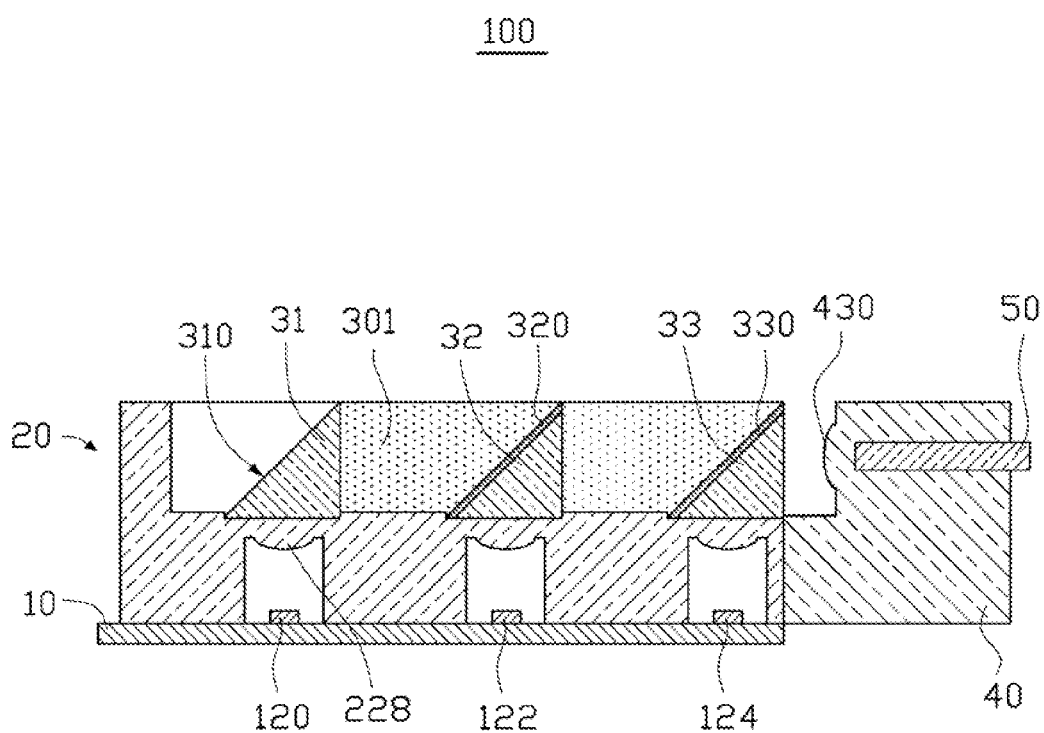
FIG. 4 is a cross sectional view of the optical communication assembly taken along line IV-IV of FIG. 1.

As shown in FIG. 4, an optical matching glue 301 is infilled into a space formed between the first light deflection element 31 and the second light deflection element 32, and into a space formed between the second light deflection element 32 and the third light deflection element 33. A refractive index of the optical matching glue 301 is the same as or similar to that of the first, the second, and the third light deflection element, 31, 32, 33. The correspondence of the refractive indexes means that reflection losses of the light signals are reduced when the light signals λ1 and λ2 are transmitted through an optically equivalent material.

The second optical coupling module 40 is substantially a step portion shape, and includes a first portion 41 and a second portion 42 connected with the first portion 41. The step portion is formed by the first portion 41 and the second portion 42. The first portion 41 includes two second positioning portions 410 engaging with the first positioning portions 224, and the second positioning portion 410 is a positioning pole. The second portion 42 includes a first side surface 420 and a second side surface 422 opposite to the first side surface 420. The first side surface 420 faces toward the outer side surface 223. A second optical coupling lens 430 is arranged centrally in the first side surface 420. The second side surface 422 is arranged with a receiving groove 440 for receiving the optical fiber 50. The receiving groove 440 is aligned with the second optical coupling lens 430.

When the optical communication assembly 100 is in use, the control chip 14 drives the first, the second, and the third light emitting elements 120, 122, 124 to emit light signals. The first, the second, the third light emitting elements 120, 122, 124 respectively emit a first color light signal λ1, a second color light signal λ2, and a third color light signal λ3. The light signals λ1, λ2, and λ3 reach each first optical coupling lens 228, and are converged by the first optical coupling lens 228 into parallel light. The parallel light respectively reaches the first reflecting surface 310, the first dichroic surface 320, and the second dichroic surface 330.

The first color light signal λ1 first is reflected by the first reflecting surface 310 onto the first dichroic surface 320 along a horizontal direction. Since the first dichroic surface 320 is able to transmit the first color light signal λ1 and reflect the second color light signal λ2, the second color light signal λ2 is collimated by the first optical coupling lens 228 and reaches the first dichroic surface 320. Both the first color light signal λ1 and the second color light signal λ2 being incident to the second dichroic surface 330. The third color light signal λ3 is collimated by the first optical coupling lens 228 and also reaches the second dichroic surface 330. The second dichroic surface 330 is able to transmit the first color light signal λ1 and the second color light signal λ2, and reflect the third color light signal λ3. The signals λ1, λ2, and λ3 are emitted from the third light deflection element 33, and then reach the second optical coupling lens 430. Thereby, the different color light signals λ1, λ2 and λ3 are collimated by the second optical coupling lens 430 and enter into and are transmitted by the single optical fiber 50. In this way, different light signals can be transmitted in a single optical fiber 50, which increases signals capacity in one optical fiber 50.

Figure 6:
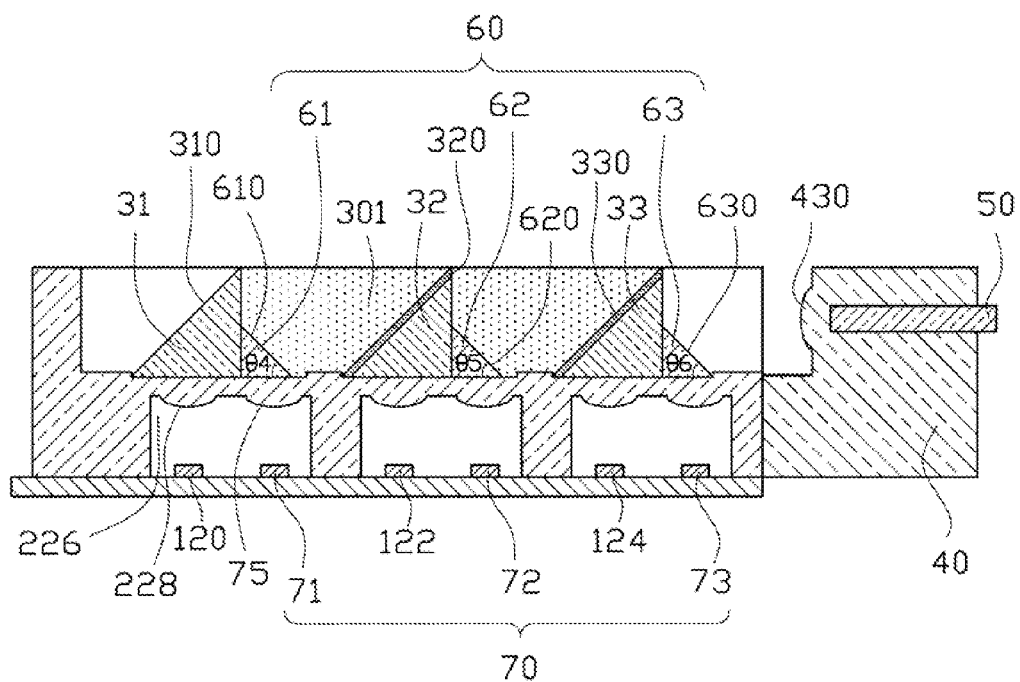
FIG. 6 is a cross-sectional view of an optical communication assembly in accordance with a second embodiment.

FIG. 6 illustrates an optical communication assembly 200 according to a second embodiment. The optical communication assembly 200 in FIG. 6 is similar to the optical communication assembly 100 in FIG. 1. The difference between the optical communication assembly 200 and optical communication assembly 100 in FIG. 1 is that the optical communication assembly 200 further includes a light reflecting module 60, a plurality of light detecting elements 70, and a plurality of third optical coupling lenses 75.

The light reflecting module 60 is also arranged on the top surface 222. The light reflecting module 60 includes a plurality of light reflecting portions, a quantity of the light reflecting portions being same as that of the light deflection elements 30. In the illustrated embodiment, the light reflecting module 60 includes a first light reflecting portion 61, a second light reflecting portion 62, and a third reflection portion 63. The first, the second, and the third light reflecting portions, 61, 62, 62 are substantially rectangular prism shaped.

The first light reflecting portion 61 includes a second reflecting surface 610, the second light reflecting portion 62 includes a third reflecting surface 620, and the third light reflecting portion 63 includes a fourth reflecting surface 630. As shown in FIG. 6, an included angle between the second reflecting surface 610 and a rectangular surface of the first light reflecting portion 61 is θ4. An included angle between the third reflecting surface 620 and the rectangular surface of the second light reflecting portion 62 is θ5, and an included angle between the fourth reflecting surface 630 and the rectangular surface of the third light reflecting portion 63 is θ6. θ4=θ5=θ6=45°.

The rectangular surface of the first light reflecting portion 61 lean against a rectangular surface of the first light deflection portion 31, the rectangular surface of the second light reflecting portion 62 lean against the rectangular surface of the second light deflection portion 62, and the rectangular surface of the third light reflecting portion 63 lean against the rectangular surface of the third light deflection portion 63.

A size of the first light reflecting portion 61 is smaller than a size of the first deflection portion 31. A size of the second light reflecting portion 62 is smaller than a size of the second light deflection portion 32, and a size of the third light reflecting portion 63 is smaller than a size of the third light deflection portion 33. Therefore, one part of the light signal from the light deflection module 30 can be emitted from the rectangular surface of the light reflecting module 60 directly, and the remaining part of the light signal can be reflected by the reflecting surface leaning against the rectangular surface.

The plurality of the light detecting elements 70 are arranged on the printed circuit board 10. In the illustrated embodiment, the light detecting element 70 is photo diode, each light detecting element 70 corresponds to the light emitting member 12, and the light detecting element 70 includes a first light detecting element 71, a second light detecting element 72, and a third light detecting element 73. The first light detecting element 71 receives part of the first color light signal λ1, the second light detecting element 72 receives part of the second color light signal λ2, and the third light detecting element receives part of the third color light signal λ3.

In the illustrated embodiment, the control chip 14 is an integrated chip. The control chip 14 is not only used for driving the light emitting element 12 to emit light, but also for processing and analyzing the light signals received by the light detecting element 70.

In the illustrated embodiment, the optical matching glue 301 is infilled into a space formed between the first light deflection element 31, the first reflecting portion 61, and the second light deflection element 32. The optical matching glue 301 also fills a space formed between the second light deflection element 32, the second reflecting portion 62, and the third light deflection element 33.

The plurality of third optical coupling lenses 73 are arranged in the receiving cavities 226 and aligned with each light detecting element 70. Each third optical coupling lens 73 is configured to converge and collimate light signals from the reflecting surface of each light reflecting portion.

Figure 7:
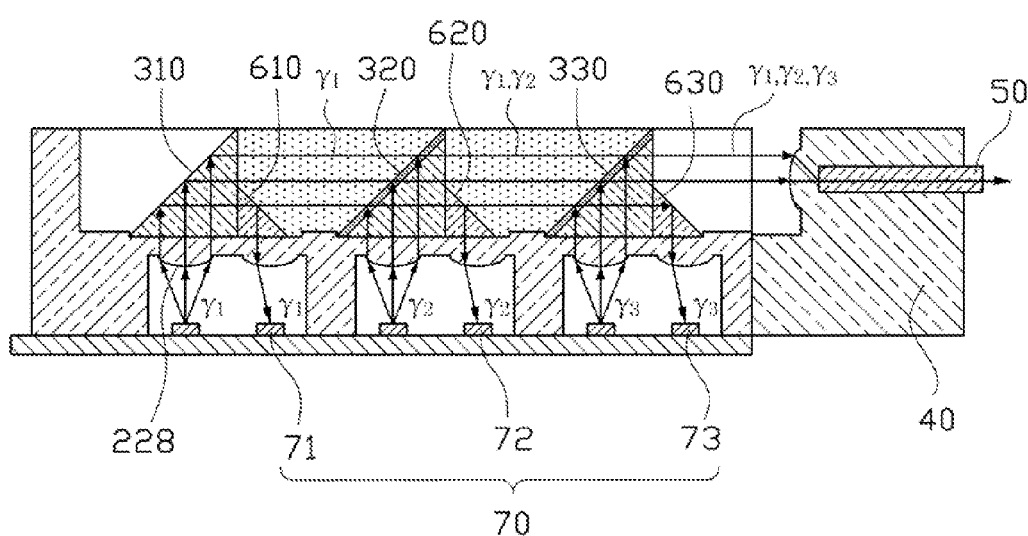
FIG. 7 is a cross-sectional view of the optical communication assembly in FIG. 6 having a plurality of rays illustrated.

As shown in FIG. 7, the working principle of the optical communication assembly 200 is similar to that of the optical communication assembly 100. A difference is that the optical communication assembly 200 is able to detect an intensity of the light signal of each light emitting element and can further analyze, when transmitted through the optical coupling lens, any loss of light using the control chip 14.

Specifically, as shown in FIGS. 6-7, the first color light signal λ1 emitted from the first light emitting element 120 firstly reaches the first reflecting surface 310, and is reflected by the first reflecting surface 310. A part of the first color light signal λ1 incident on the first dichroic surface 320 will eventually be coupled into the optical fiber 50 and due to the rectangular surface of the first light reflecting portion 61 lean against a rectangular surface of the first light deflection portion 31, a part of the light signal reflected by the first reflecting surface 310 will reach the second reflecting surface 610, and be collimated by the third optical coupling lens 75. This part of the light signal is then received by the first light detecting element 71, the control chip 14 is configured to receive the light signal and convert it into electrical signals, and any loss or degradation of the first light signal transmitted between the optical coupling lens can be analyzed and calculated. The working principle of the second and the third light detecting elements 72, 73 is similar to that of the first light detecting element 71.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical communication assembly comprising:
    a printed circuit board having a light emitting member, the light emitting member comprising a plurality of light emitting elements, each of the plurality of light emitting elements emitting a single color light signal;
    a first optical coupling module comprising a plurality of first optical coupling lenses, each of the plurality of first optical coupling lens corresponding with each of the plurality of light emitting elements;
    a light deflection module comprising a plurality of light deflection elements arranging in order, each of the plurality of light deflection element corresponding with each of the plurality of optical coupling lenses; a first one of the plurality of the light deflection elements comprising a first reflecting surface and remaining ones of the plurality of light deflection elements each comprising a dichroic surface, wherein the first reflecting surface being parallel with the dichroic surface; the first reflecting surface being configured to reflect light signal from one of the first optical coupling lenses; each dichroic surface being configured to reflect light signal from one of the first optical coupling lenses and transmit the light signal from a front light deflection element; and
    a second optical coupling module comprising a second optical coupling lens and an optical fiber aligned with the second optical coupling lens, color light signals emitted from the light emitting elements being coupled by the corresponding first optical coupling lens, reflected and transmitted by the light deflection module and then coupled into the single optical fiber.

2. The optical communication assembly of claim 1, wherein the first optical coupling module is fixed on the printed circuit board, the first optical coupling module comprises a base and a side wall connected with the base, the base and the side wall being injected in a mold.

3. The optical communication assembly of claim 2, wherein the base is made from transparent plastic and substantially cuboid, the base comprises a bottom surface, an opposite top surface, and an outer side surface perpendicularly connecting with the bottom surface and the top surface, the side wall connects with the top surface and extends away from the top surface.

4. The optical communication assembly of claim 3, wherein the bottom surface defines a plurality of receiving cavities spacing apart each other, each receiving cavity comprises a bottom end surface, and each bottom end surface is arranged with the first optical coupling lens.

5. The optical communication assembly of claim 3, wherein the side wall and the top surface together form a receiving space, the bottom of the receiving space defines a plurality of limiting areas, and the limiting areas are configured to place the light deflection module.

6. The optical communication assembly of claim 5, wherein the light deflection module comprises a first light deflection element, a second light deflection element and a third light deflection element, the first light deflection element, the second light deflection element and the third light deflection element are substantially rectangular prism shape and have a same size with other.

7. The optical communication assembly of claim 6, wherein the first light deflection element comprises the first reflecting surface, the second light deflection element comprises a first dichroic surface, the third light deflection element comprises a second dichroic surface, the first reflecting surface is used for reflecting the first color light signal $\lambda 1$ emitting from the corresponding first optical coupling lens, the first dichroic surface is configured for transmitting the first color light signal $\lambda 1$ and reflecting the second color signal light $\lambda 2$ emitting from the corresponding first optical coupling lens, the second dichroic surface is used for transmitting the first and the second color light signal $\lambda 1$ and $\lambda 2$, and reflecting the third color light signal $\lambda 3$ emitting from the corresponding first optical coupling lens.

8. The optical communication assembly of claim 7, wherein an included angle between the first reflecting surface and a rectangular surface of the first light deflection element is $\theta 1$, included angle between the first dichroic surface and the rectangular surface of the second light deflection element is $\theta 2$, included angle between the second dichroic surface and the rectangular surface of the third light deflection element is $\theta 3$, and $\theta 1 = \theta 2 = \theta 3 = 45°$.

9. The optical communication assembly of claim 7, further comprising an optical matching glue, wherein the optical matching glue is filled in a space formed between the first light deflection element and the second light deflection element, and a space formed between the second light deflection element and the third light deflection element, and a refractive index of the optical matching glue is the same or similar with a refraction index of the first, the second and the third light deflection element.

10. The optical communication assembly of claim 9, wherein the second optical coupling module is substantially a step portion shape, and comprises a first portion and a second portion connected with the first portion, the first portion comprises two second positioning portions engaging with the first positioning portions.

11. The optical communication assembly of claim 10, wherein the second portion comprises a first side surface and a second side surface opposite to the first side surface, and the first side surface faces toward the outer side surface, the first side surface is arranged with a second optical coupling lens at central thereof, and the second side surface is arranged with a receiving groove for receiving the optical fiber, and the receiving groove is aligned with the second optical coupling lens.

12. The optical communication assembly of claim 11, further comprising a light reflecting module being arranged on the top surface and leaning against the light deflection module, wherein the light reflecting module comprises a plurality of light reflecting portions corresponding with the light reflecting deflection elements, the third light reflecting portions are substantially rectangular prism shape, each light reflecting portion comprises a light reflecting surface, and the reflecting surface is configured to reflecting one part of light signal from the light deflection module.

13. The optical communication assembly of claim 12, wherein a size of the light reflecting portion is smaller than a size of the corresponding light deflection portion.

14. The optical communication assembly of claim 12, further comprising a plurality of third optical coupling lenses being arranged in each the receiving cavities and aligned with each light detecting element, wherein each the third optical coupling lens is configured to converge and collimate light signal from the reflecting surface of each the light reflecting portion.

15. The optical communication assembly of claim 12, further comprising plurality of light detecting elements being arranged on the printed circuit board, wherein each light detecting element is corresponded to each light emitting member, and the light detecting element is configured to receive the other part of the first color light signal.

16. The optical communication assembly of claim 12, wherein the control chip is an integrated chip, and the control chip is configured to drive the light emitting element to emit light, process and analyze the light signal received by the light detecting element.

* * * * *